United States Patent [19]

Peters

[11] 4,250,019
[45] Feb. 10, 1981

[54] MULTIPLE STAGE HYDROCARBON CONVERSION PROCESS

[75] Inventor: Kenneth D. Peters, Elmhurst, Ill.

[73] Assignee: UOP Inc., Des Plaines, Ill.

[21] Appl. No.: 73,169

[22] Filed: Sep. 6, 1979

[51] Int. Cl.³ .............................................. G10G 63/02
[52] U.S. Cl. .................................... 208/49; 208/165; 208/169
[58] Field of Search ..................... 208/49, 64, 65, 165, 208/169

[56] References Cited

U.S. PATENT DOCUMENTS

| | | | |
|---|---|---|---|
| 2,374,109 | 4/1945 | Layng et al. | 208/64 |
| 4,110,197 | 8/1978 | Herning et al. | 208/64 |

Primary Examiner—Herbert Levine
Attorney, Agent, or Firm—James R. Hoatson, Jr.; Robert W. Welch; William H. Page, II

[57] ABSTRACT

A multiple stage hydrocarbon conversion system wherein a hydrogen-hydrocarbonaceous feedstock reaction mixture is processed serially through a plurality of reaction zones, each of which contains a particulate catalyst disposed as an annular-form bed movable downwardly through the reaction zone, and wherein said reaction mixture is processed in radial flow through said annular-form bed. Pinning of the catalyst particles within the annular-form bed is substantially alleviated by the device of charging only a portion of the total hydrogen to the first reaction zone, and charging the balance of the total hydrogen to a subsequent reaction zone.

6 Claims, 1 Drawing Figure

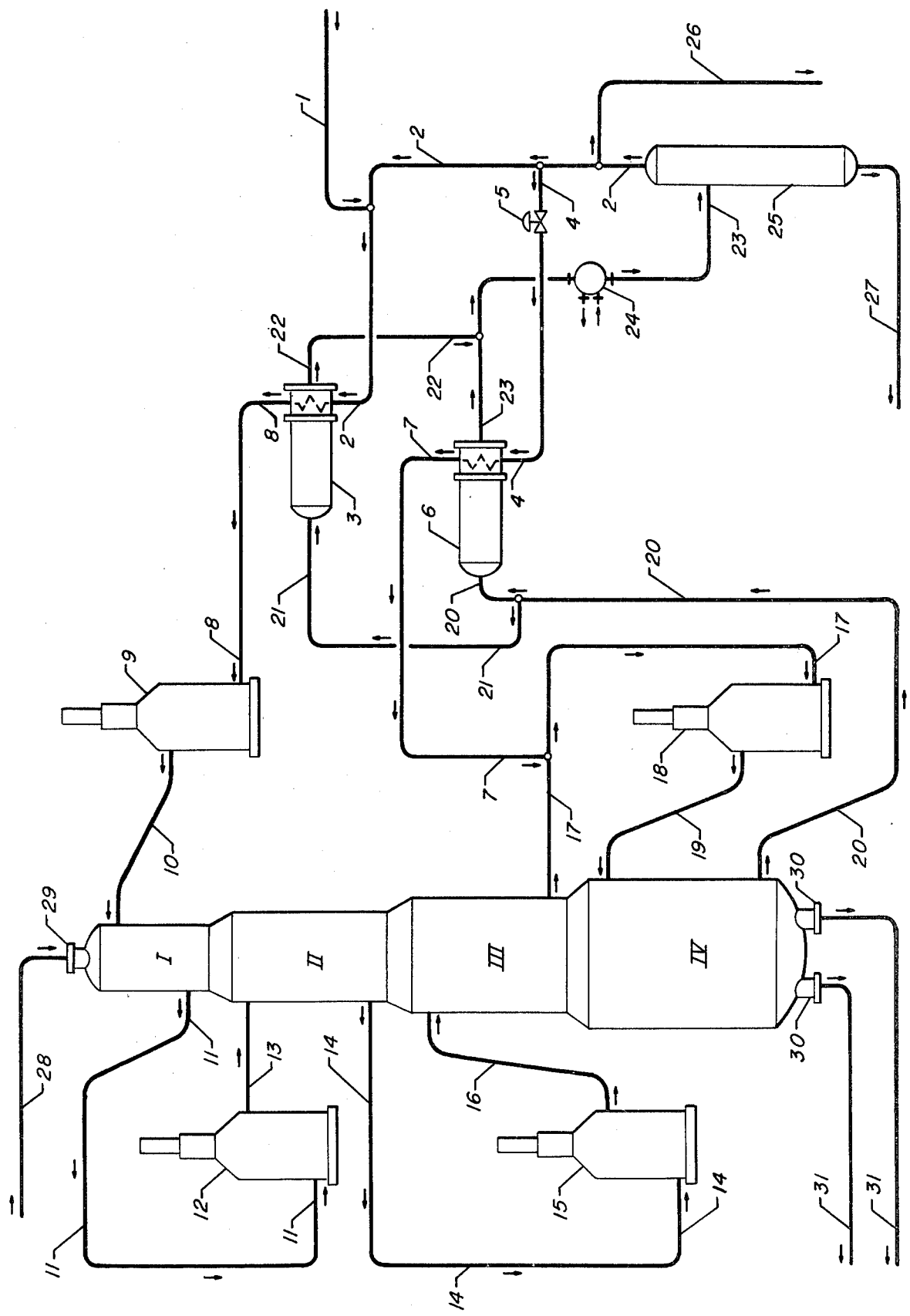

MULTIPLE STAGE HYDROCARBON CONVERSION PROCESS

This invention relates to a method for the catalytic conversion of a hydrocarbonaceous feedstock in a plurality of reaction zones of a multiple stage reaction system wherein a hydrogen-hydrocarbon reaction mixture is serially processed through said plurality of reaction zones in contact with a particulate catalyst gravitating downwardly through each of said reaction zones. The method is particularly adapted for use with a vapor phase hydrocarbon conversion process embracing hydrocarbon conversion reactions which are primarily endothermic reactions, and wherein the reaction mixture is processed downwardly and in essentially radial flow contact with the downwardly moving catalyst particles.

Multiple stage reaction systems such as herein contemplated have found extensive use in the petroleum and petrochemical industries for effecting a variety of hydrocarbon conversion reactions. Said reactions are either exothermic or endothermic and encompass both hydrogen producing and hydrogen consuming reactions. Multiple stage reaction systems usually take one of two forms. Thus, in an endothermic hydrocarbon conversion process, said system may comprise a side-by-side reactor configuration wherein a reactant stream is processed serially from the reaction zone of one reactor through the reaction zone of another reactor with intermediate heating of the reactant stream between reaction zones; or said system may comprise a stacked reactor design wherein a reactant stream is passed serially from a reaction zone of a topmost reactor to a reaction zone of a lowermost reactor, with intermediate heating of the reactant stream. Such systems have been utilized in the petroleum industry to effect numerous hydrocarbon conversion reactions including catalytic reforming, alkylation, dehydrogenation of ethylbenzene, and the like. The method of this invention is particularly useful with respect to an endothermic, vapor phase hydrocarbon conversion process wherein catalyst particles are movable via gravity flow, and the multiple stage reaction system may comprise side-by-side reactors, stacked reactors, or a combination thereof.

Since catalyst particles movable through a reaction system by gravity flow are necessarily moving in a downward direction, the present method contemplates the withdrawal of catalyst particles from the bottom of one reaction zone and the introduction of said catalyst particles, fresh catalyst particles and/or regenerated catalyst particles to the top portion of a reaction zone next in sequence. The present method is intended to be applied to those reaction systems wherein the downwardly moving catalyst particles are disposed as an annular-form bed in a reaction zone, and the downward flow of the reactant stream is essentially radial flow with respect thereto.

A radial flow reaction system generally consists of tubular form sections of varying nominal cross sectional areas, said sections being vertically and coaxially disposed to form the reaction vessel. Briefly, the system consists of an outer tubular reaction chamber containing a coaxially disposed tubular catalyst retaining screen with a nominal internal cross sectional area less than that of said chamber, and a tubular perforated centerpipe having a nominal internal cross sectional area which is less than that of said catalyst retaining screen. The vapor phase reactant stream is introduced into the outer annular space created by the chamber wall and the catalyst retaining screen, the latter forming an annular-form catalyst holding zone with the perforated centerpipe. The reactant stream flows laterally and radially from said outer annular space through the catalyst retaining zone into said centerpipe and out of the reaction chamber.

Illustrative of a multiple stage stacked reaction zone system, to which the present invention is particularly adaptable, is that shown in U.S. Pat. No. 3,706,536 (CL. 23-288G), issued Dec. 19, 1972. Transfer of the gravity flowing catalyst particles, from one reaction zone to another, as well as introduction of fresh catalyst particles and the withdrawal of spent catalyst particles, is effected through utilization of a plurality of catalyst transfer conduits. Experience in the use of such systems, as well as those where the reaction zones are disposed in a side-by-side relationship indicates that the high vapor flow through the annular-form catalyst holding sections results in catalyst particles being pinned in the vicinity of the perforated centerpipe. Stagnant catalyst areas where the catalyst particles are prevented from assuming the gravity flow pattern are thereby created.

It is therefore an object of this invention to substantially alleviate the catalyst pinning problem in a multiple stage hydrocarbon conversion system wherein catalyst particles are movable via gravity flow. More specifically, it is an object of this invention to substantially alleviate said catalyst pinning problem in a multiple stage hydrocarbon conversion system comprising a plurality of reaction zones wherein catalyst particles are disposed in an annular-form bed in each of said reaction zones in said catalyst particles are movable downwardly through each of said zones via gravity flow.

Therefore, in a multiple stage hydrocarbon conversion system wherein (1) a mixture of hydrogen and a hydrocarbonaceous feedstock is heated and processed serially through a plurality of catalytic reaction zones, (2) rection product effluent from each reaction zone is heated prior to introduction into the next succeeding reaction zone, and (3) catalyst particles are movable through each reaction zone via gravity flow, the present invention embodies the method of effecting the conversion of said hydrocarbonaceous feedstock which comprises the steps of: (a) initially admixing from about 40 to about 80 mole % of the total hydrogen charged to said multiple stage hydrocarbon conversion system with the hydrocarbonaceous feedstock charged thereto, heating the mixture and introducing the heated mixture into the first reaction zone of said multiple stage hydrocarbon conversion system at hydrocarbon conversion conditions; (b) admixing the balance of said hydrogen with the resulting first reaction zone effluent, or with the effluent of a succeeding reaction zone, heating the mixture and introducing the heated mixture into the next succeeding reaction zone at hydrocarbon conversion conditions; (c) recovering the effluent from the last of said reaction zones; and (d) at least periodically withdrawing catalyst particles from the last of said reaction zones, and introducing fresh or regenerated catalyst particles into the first of said reaction zones.

In a more specific embodiment, this invention relates to a method for effecting the catalytic reforming of a naphtha boiling range hydrocarbonaceous feedstock in a multiple stage hydrocarbon conversion system which comprises the steps of: (a) initially admixing from about 60 to about 70 mole % of the total hydrogen charged to said multiple stage hydrocarbon conversion system with the hydrocarbonaceous feedstock charged thereto, and introducing the heated mixture into the first of four reaction zones of said multiple stage hydrocarbon conversion system; (b) admixing the balance of said hydrogen with the third reaction zone effluent, heating the mixture, and introducing the heated mixture into the fourth reaction zone; (c) recovering the effluent from said fourth reaction zone and passing a portion thereof in heat exchange relationship with said hydrogen and hydrocarbonaceous feedstock mixture prior to heating and introducing said mixture into said first reaction zone; (d) passing another portion of said effluent in heat exchange relationship with said balance of said total hydrogen prior to admixture with said first reaction zone effluent; and (e) at least periodically withdrawing catalyst particles from said fourth reaction zone, and introducing fresh or regenerated catalyst particles into said first reaction zone.

This embodiment is further characterized in that said multiple stage reaction system comprises four reaction zones disposed as a vertical stack having a common vertical axis, and the catalyst particles are movable from one reaction zone to the next lower reaction zone in said stack via gravity flow.

Other objects and embodiments of this invention will become apparent in the following detailed specification.

U.S. Pat. No. 4,119,526 is illustrative of a multiple stage hydrocarbon conversion system comprising a plurality of reaction zones such as herein contemplated. The patented invention is directed to a solution of the catalyst pinning problem which is the focus of the present invention. As with the present invention, a hydrocarbonaceous feedstock and hydrogen mixture is processed serially through a plurality of reaction zones in each of which catalyst particles are movable downwardly via gravity flow. The catalyst pinning problem is dealt with by restricting the effluent of at least one reaction zone, and also the flow of the hydrogen-rich vapor phase separated from the last reaction zone effluent and recycled to the first reaction zone. The resulting increased density of the reaction zone feed, and the pressure drop within the entire reactor circuit serves to alleviate the catalyst pinning problem. However, while the problem addressed by the patented invention is essentially the same as that of the present invention, the present invention affords a distinctly independent solution thereto.

The method of the present invention is suitable for use in hydrocarbon conversion systems which are characterized as multiple stage, and in which catalyst particles are movable via gravity through each reaction zone. Furthermore, the present invention is principally intended for utilization in reactor systems where the principal reactions are endothermic and are effected in vapor phase. Although the following discussion is specifically directed toward catalytic reforming of naphtha boiling range fractions, there is no intent to so limit the present invention. Catalytic reforming, as well as many other processes, has experienced several phases of development currently terminating in the system in which the catalyst beds assume the form of a descending column in one or more reaction vessels. Typically, the catalysts are utilized in substantially spherical form having a nominal diameter ranging from about 1/32 inch to about 5/32 inch in order to offer free flow characteristics which will neither bridge, nor block the descending column, or columns of catalyst within the overall system.

In one such multiple stage system, the reaction chambers are vertically stacked and a plurality, generally from about 6 to about 16, of relatively small diameter conduits are employed to transfer catalyst particles from one reaction zone to the next lower reaction zone via gravity flow and ultimately to withdraw catalyst particles from the last reaction zone. The latter are usually transported to the top of a catalyst regeneration facility, also functioning with a descending column of catalyst particles. Regenerated catalyst particles are then transported to the top of the upper reaction zone of the stack. In order to facilitate and enhance gravity flow within each reaction vessel, as well as from one zone to another, it is particularly important that the catalyst particles have a relatively small nominal diameter, and one which is preferably less than about 5/32 inch. In a conversion system having the individual gravity flow reaction zones in side-by-side relationship, catalyst transport vessels of the type shown in U.S. Pat. No. 3,839,197 are employed in transferring the particles from the bottom of one zone to the top of the succeeding zone, and from the last reaction zone to the top of the regeneration facility.

Catalytic reforming of naphtha boiling range hydrocarbons, a vapor phase operation, is effected at hydrocarbon conversion conditions including catalyst bed temperatures in the range of about 700° F. to about 1020° F. Judicious and cautious techniques generally dictate that catalyst temperatures not substantially exceed a level of about 1020° F. Other conditions include a pressure of from about 50 psig. to about 1000 psig., a liquid hourly space velocity (defined as volumes of fresh charge stock per hour, per volume of total catalyst particles) in the range of about 0.2 to about 10 and a hydrogen to hydrocarbon mole ratio generally in the range of about 0.5:1 to 10:1. As those skilled in the petroleum refining arts are aware, the described continuous regenerative reforming system offers numerous advantages when compared to the prior art fixed bed systems. Among these is the capability of efficient operation at comparatively lower pressures—e.g. 50 psig. to about 200 psig.—and higher liquid hourly space velocities—e.g. about 3:1 to about 8:1. As a result of continuous catalyst regeneration, higher consistent inlet catalyst bed temperatures can be maintained—e.g. 950° F. to about 1010° F. Furthermore, there is afforded a corresponding increase in both hydrogen production and hydrogen purity in the recycled vaporous phase from the product separation facility.

Catalytic reforming reactions are varied, and include dehydrogenation of naphthenes to aromatics, dehydrocyclization of paraffins to aromatics, hydrocracking of long chain paraffins into lower boiling, normally liquid material and, to a certain extent, the isomerization of paraffins. These reactions, the net result of which is endothermicity with respect to the overall reaction system, are effected through the utilization of one or more Group VIII noble metals (e.g. platinum, iridium, rhodium, palladium) combined with a halogen (e.g. chlorine and/or fluorine) and a porous carrier material such as alumina. Relatively recent investigations have indicated that more advantageous results are attainable and enjoyed through the cojoint use of a catalytic modifier; these have been selected from the group of cobalt, nickel, gallium, germanium, tin, rhenium, vanadium and mixtures thereof, etc. Regardless of the selected catalytic composite, the ability to attain the advantage over the common fixed bed systems is greatly dependent upon achieving acceptable catalyst particle flow downwardly through the system. Not only must this be substantially uniform throughout the cross section of the annular catalyst bed, but stagnant areas of catalyst must be maintained at the most achievable minimum.

Catalytic reforming is a well known process which has been thoroughly described in the literature, having been a commercially important tool of the petroleum refining industry for about three decades. One of the many things gleaned from the vast amount of catalytic reforming experience and resulting knowledge, is the soundness of utilizing multiple stages, each of which contains a different quantity of catalyst, generally expressed as volume percent. The reactant stream, hydrogen and the hydrocarbon feed, flow serially through the reaction zones in order of increasing catalyst volume with, of course, interstage heating. In a three reaction zone system, typical catalyst loadings are: first, 10% to about 30%; second, from about 20% to about 40%; and, third, from about 40% to about 60%. With respect to a four reaction zone system, suitable catalyst loadings would be: first, 5% to about 15%, second, 15% to about 25%; third, 25% to about 35%; and, fourth, 35% to about 50%. Unequal catalyst distribution, increasing in the serial direction of reactant stream flow, facilities and enhances the distribution of the reactions as well as the overall heating of reaction.

As hereinbefore stated, the pinning of catalyst particles to the perforated centerpipe stems primarily from the high vapor velocity laterally across the annular-form catalyst holding zone, this adverse effect increasing in degree as the cross sectional area and length of the catalyst bed decreases. In multiple stage catalytic reforming systems, therefore, the effect is most pronounced in the first and second reaction zones, having the smaller annular cross sectional areas, somewhat less in the third reaction zone and of a relatively minor consequence in the fourth reaction zone due to its length and larger cross sectional catalyst area. By the device of diverting a portion of the hydrogen-rich vapor phase normally recycled to the first reaction zone, and recycling said diverted portion to a subsequent reaction zone, the flow rate of the vapor phase reaction mixture across the annular-form catalyst holding zone therein is reduced to the point where the tendency of the catalyst particles to become pinned is substantially obviated. While the hydrogen-rich vaporous phase diverted around the first reaction zone is advantageously recycled to any of the subsequent reaction zones, it is a preferred practice to recycle the diverted material to the last reaction zone to alleviate the coking tendency of said zone wherein catalyst coking is most pronounced. As heretofore mentioned, the hydrogen/hydrocarbon mole ratio of the hydrogen-hydrocarbonaceous feedstock mixture charged to the first reaction zone is generally in the range of from about 0.5:1 to about 10:1. More often, a hydrogen/hydrocarbon mole ratio of from about 3:1 to about 6:1 is preferred—particularly in a multiple stage catalytic reforming system. In any case, from about 40 to about 80 mole percent of said hydrogen is admixed with the hydrocarbonaceous feedstock charged to the first reaction zone, the balance being charged to a subsequent reaction zone—preferably the last reaction zone. More preferably, from about 60 to about 70 mole percent of said hydrogen is admixed with the hydrocarbonaceous feedstock and charged to the first reaction zone.

Catalyst pinning is in large part a function of two dependent variables: (1) the vapor mass flow rate, and (2) the density of the vapors which flow through the annular-form catalyst bed into and through the perforated centerpipe. To reduce or eliminate catalyst pinning, for a given design flow of fresh feedstock, the rate at which the hydrogen recycle gas is recycled to the system must be reduced. This will, however, reduce the total mass flow to a given reaction zone, and this in turn reduces the reactor system pressure drop. Of course, the effective pressure in the initial reactor, in which catalyst pinning is most prevalent and troublesome, is reduced, and a corresponding reduction in vapor density ensues. In bypassing the initial reactor and diverting a portion of the hydrogen-rich recycle gas to a subsequent reactor in series therewith in the manner herein contemplated, the pressure drop across the reactor system is increased, and the reactors preceding said subsequent reactor experience a pressure increase and a corresponding increase in vapor density to substantially alleviate the catalyst pinning problem therein.

In further description of the present invention, reference is made to the accompanying drawing.

It is understood that the drawing is presented solely for purposes of illustration, and the same is not intended as a limitation on the generally broad scope of the invention as set out in the appended claims. Therefore, miscellaneous appurtenances well within the purview of those skilled in the art and not required for a complete understanding of the invention, have been eliminated or reduced in number. The illustrated embodiment is presented as a simplified schematic flow diagram showing a four reactor or reaction zone catalytic reforming system having an uppermost or first reaction zone I, two intermediate reaction zones II and III, and a lowermost or fourth reaction zone IV.

Referring then to the drawing, a stacked, gravity flow, catalytic reaction system is shown as having four individual reacion zones which are sized as to length and annular catalyst cross sectional area such that the distribution of the total catalyst volume is 10% in zone I, 15% in zone II, 25% in zone III, and 50% in zone IV. In a normal, substantially problem-free operation, fresh or regenerated catalyst particles are introduced through conduit 28 and inlet port 29 into the uppermost reaction zone I, and said particles gravitate downwardly into reaction zone II, from reaction zone II to reaction zone III, and from reaction zone III to reaction zone IV, said particles being ultimately withdrawn from the reactor system through a plurality of outlet ports 30 and conduit 31. Catalyst particles thus recovered may be transported to a continuous regeneration zone, not shown, or may be stored until a sufficient quantity is available for a batch type regeneration. The rate of catalyst flow through the reactor system, or the period of time required for catalyst particles to be introduced into the system, traverse the four reaction zones, and be withdrawn for regeneration, is determined by the rate at which the latter is effected. By monitoring various operating parameters while the system is in continuous operation, the catalyst withdrawal rate, or regeneration load, can be controlled.

A naphtha boiling range hydrocarbon feedstock is admitted to the process by way of line 1 and admixed with one portion of a hydrogen-rich vapor phase recovered from a separator 25 through line 2 as hereinafter related. The hydrocarbon feedstock is admixed with said hydrogen-rich vapor phase to provide a reaction mixture having a hydrogen/hydrocarbon mole ratio of about 3:1, and said mixture is continued through line 2 to a heat exchanger 3 wherein the mixture is preheated by indirect heat exchange with the bulk of the hot reaction mixture effluent recovered from the lowermost reaction zone IV through line 20.

A second portion of said hydrogen-rich vapor phase recovered from said separator 25 is diverted from line 2 through line 4 and a flow control valve 5 and passed to a second heat exchanger 6 wherein said diverted hydrogen-rich vapor phase is preheated by indirect heat exchange with another portion of said hot reaction mixture effluent recovered from the lowermost reaction zone IV via line 20. This last-mentioned preheated hydrogen-rich vaporous phase is recovered from the heat exchanger 6 through line 7 and recycled to the lowermost reaction zone IV as hereinafter described.

The hydrogen-hydrocarbon reaction mixture preheated in heat exchanger 3 exits from the heat exchanger by way of line 8 and enters a charge heater 9 wherein the mixture is heated to provide a desired inlet temperature to the catalyst bed disposed in the uppermost reaction zone I. The heated mixture is recovered from said charge heater 9 and charged to said reaction zone through line 10. The hydrogen-hydrocarbon reaction mixture is processed downwardly through said uppermost reaction zone I, and the effluent from said reaction zone is recovered and transferred to a first intermediate charge heater 12 by way of line 11. The effluent stream is thus reheated to provide a desired inlet temperature to the next catalyst bed disposed in the first intermediate reaction zone II, the reheated effluent stream being charged to said reaction zone by way of line 13. The hydrogen-hydrocarbon reaction mixture is continued downwardly through said reaction zone II, and the reaction zone effluent is recovered through line 14, reheated in a second intermediate charge heater 15, and charged to a second intermediate reaction zone III through line 16 to provide a desired inlet temperature to the catalyst bed disposed therein. The reaction zone III effluent stream is withdrawn through line 17 and admixed with the aforementioned preheated hydrogen-rich vaporous phase recycled through line 7 to provide a reaction mixture having a hydrogen/hydrocarbon mole ratio of about 4.5. The hydrogen enriched reaction mixture is then continued through line 17 to a third and last intermediate charge heater 18 wherein the mixture is reheated to provide a desired inlet temperature to the catalyst bed disposed in the lowermost reaction zone IV. The reheated mixture is transferred from the last-mentioned heater to said reaction zone IV by way of line 19.

The hot reaction mixture effluent stream from the lowermost reaction zone IV is recovered through line 20 and utilized as a heat exchange medium in the heat exchangers 3 and 6. The hot effluent stream is distributed to heat exchanger 6 through line 20, and to heat exchanger 3 through line 20 and line 21. The reaction mixture effluent thus cooled is recovered from heat exchanger 3 by way of line 22, and from heat exchanger 6 by way of line 23, the heat exchanger effluent streams being combined in line 23 and passed through a condenser 24 wherein further cooling and condensation is effected at a temperature of from about 60° to about 140° F. The mixture is continued through line 23 to a separator 25. A hydrogen-rich vapor phase is withdrawn from the separator 25 through line 2, and excess hydrogen is discharged from the process through line 26 at a rate determined by pressure control means not shown. The balance of the hydrogen-rich vapor phase is continued through line 2 for recycle to the uppermost reaction zone I in admixture with the hydrocarbon feedstock, and for recycle to the lowermost reaction zone IV, all in accordance with the foregoing process description. A normally liquid phase portion of the reaction mixture is withdrawn from the separator 25 through line 27 and treated in conventional fractionation facilities which are not shown.

To reiterate, by diverting a portion of the hydrogen-rich recycle gas to the lowermost reaction zone, a portion which would normally be included in the hydrogen-rich recycle gas charged to the uppermost reaction zone, the flow rate of the vapor phase reaction mixture to and through the initial reaction zones is reduced to the point where the tendency of the catalyst particles to become pinned therein is substantially obviated. Further, by preheating and injecting the diverted hydrogen-rich recycle gas into the last intermediate charge heater, the load on said heater is appreciably reduced, and the improved thermal conductivity of the lowermost reaction zone effluent enhances the heat exchange capacity of the downstream heat exchangers. And still further, recycling of the diverted hydrogen-rich recycle gas through the last intermediate charge heater to the lowermost reaction zone helps to alleviate the coking tendency of said reaction zone wherein the bulk of the catalyst coking typically occurs.

I claim as my invention:

1. In a multiple stage hydrocarbonaceous feedstock conversion system wherein (1) a mixture of hydrogen and said hydrocarbonaceous feedstock with a hydrogen/hydrocarbon mole ratio of from about 0.5:1 to about 10:1 is heated and processed serially through a series of four catalytic reaction zones, (2) the reaction product effluent from each reaction zone is heated prior to introduction into the next succeeding zone, and (3) catalyst particles are movable through each reaction zone via gravity flow, the method of effecting the conversion of said feedstock which comprises the steps of:

initially admixing from about 40 to about 80 mole percent of said hydrogen with said hydrocarbonaceous feedstock, heating the mixture, and introducing the heated mixture into the first reaction zone of said multiple stage hydrocarbonaceous feedstock conversion system at hydrocarbon conversion conditions;

(b) heating and admixing the balance of said hydrogen with the effluent from the third reaction zone of said series, heating the mixture, and introducing the heated mixture into the next succeeding reaction zone at hydrocarbon conversion conditions;

(c) recovering the effluent from the fourth of said reaction zones in the series;

(d) at least periodically withdrawing catalyst particles from the fourth reaction zone; and, (e) at least periodically introducing fresh or regenerated catalyst particles into said first reaction zone.

2. The method of claim 1 further characterized in that said reaction zones are disposed in side-by-side relationship and catalyst particles are transferred from the bottom of one reaction zone to the top of the next succeeding reaction zone.

3. The method of claim 1 further characterized in that said reaction zones are stacked and share a common vertical axis, and catalyst particles flow via gravity from one reaction zone to the next lower reaction zone in said stack.

4. The method of claim 1 further characterized with respect to step (a) in that from about 60 to about 70 mole percent of said hydrogen is admixed with said hydrocarbonaceous feedstock.

5. The method of claim 1 further characterized with respect to step (c) in that at least a portion of said fourth reaction zone effluent is passed in heat exchange relationship with said balance of said hydrogen prior to admixture with said third reaction zone effluent in accordance with step (b).

6. The method of claim 1 further characterized with respect to step (c) in that at least a portion of said fourth reaction zone effluent is passed in heat exchange relationship with said hydrogen and hydrocarbonaceous mixture prior to heating and introduction thereof into said first reaction zone in accordance with step (a).

* * * * *